US008445053B2

(12) United States Patent
Holst et al.

(10) Patent No.: US 8,445,053 B2
(45) Date of Patent: May 21, 2013

(54) CONCENTRATE DERIVED FROM A MILK PRODUCT ENRICHED IN NATURALLY OCCURING SIALYLLACTOSE AND A PROCESS FOR PREPARATION THEREOF

(75) Inventors: Hans Henrik Holst, Viby (DK); William S. Gunther, Viby (DK); Mette Toft Mogensen, Viby (DK); Anders Steen Jørgensen, Viby (DK)

(73) Assignee: Arla Foods Amba, Viby J (DK)

( * ) Notice: Subject to any disclaimer, the term of this patent is extended or adjusted under 35 U.S.C. 154(b) by 0 days.

(21) Appl. No.: 12/929,532

(22) Filed: Jan. 31, 2011

(65) Prior Publication Data

US 2011/0212244 A1    Sep. 1, 2011

Related U.S. Application Data

(62) Division of application No. 11/592,219, filed on Nov. 3, 2006, now abandoned.

(60) Provisional application No. 60/733,204, filed on Nov. 4, 2005.

(51) Int. Cl.
A23C 9/00 (2006.01)

(52) U.S. Cl.
USPC ............ 426/587; 426/490; 426/491; 426/580

(58) Field of Classification Search
USPC ................. 426/478, 490, 491, 580, 583, 587, 426/588
See application file for complete search history.

(56) References Cited

U.S. PATENT DOCUMENTS

| | | | |
|---|---|---|---|
| 5,118,516 A | 6/1992 | Shimatani et al. | |
| 5,270,462 A | 12/1993 | Shimatani et al. | |
| 5,575,946 A | 11/1996 | Beck et al. | |
| 5,714,075 A | 2/1998 | Brian et al. | |
| 5,980,961 A | 11/1999 | Berrocal et al. | |
| 6,270,827 B1 | 8/2001 | Gaull et al. | |
| 6,323,008 B1 | 11/2001 | Pelletier et al. | |
| 6,454,946 B1 | 9/2002 | DeFrees | |
| 6,630,452 B2 | 10/2003 | Wilson | |
| 6,827,960 B2 | 12/2004 | Kopf et al. | |
| 6,852,352 B2 | 2/2005 | Kopf et al. | |
| 6,875,459 B2 | 4/2005 | Kopf et al. | |
| 6,936,173 B2 | 8/2005 | DeFrees | |
| 2004/0142068 A1 | 7/2004 | Kopf et al. | |
| 2004/0202765 A1 | 10/2004 | McMahon et al. | |
| 2005/0053707 A1 | 3/2005 | Kopf et al. | |

FOREIGN PATENT DOCUMENTS

| | | |
|---|---|---|
| FR | 2 673 359 | 9/1992 |
| JP | 1-168693 | 7/1989 |
| JP | 3-143351 | 6/1991 |
| JP | 4-316450 | 11/1992 |
| JP | 5-276876 | 10/1993 |
| JP | 7-267866 | 10/1995 |
| JP | 9-315981 | 10/1997 |
| JP | 10-99048 | 4/1998 |
| JP | 10-117684 | 5/1998 |
| JP | 2003-522784 | 7/2003 |
| JP | 2005008584 | 1/2005 |
| WO | WO 98/15581 | 4/1998 |
| WO | WO 01/60346 A2 | 8/2001 |
| WO | WO 2004/032639 A1 | 4/2004 |
| WO | WO 2005/000040 A1 | 1/2005 |
| WO | WO 2006/087391 A1 | 8/2005 |

OTHER PUBLICATIONS

B. Wang et al., "The role and potential of sialic acid in human nutrition," European Journal of Clinical Nutrition (2003) 57: 1351-1369.
Roland Schauer, "Achievements and challenges of sialic acid research," Glycoconjugate Journal (2000) 17: 485-499.
T.H. Tram et al., "Sialic acid content of infant saliva: comparison of breast fed with formula fed infants," Archives of Disease in Childhood (1997) 77: 315-318.
B. Wang et al., "A longitudinal study of salivary sialic acid in preterm infants: Comparison of human-milk-fed versus formula-fed infants," J Pediatr (2001) 138: 914-6.
B. Wang et al., "Brain ganglioside and glycoprotein sialic acid in breastfed compared with formula-fed infants[1-3]," The American Journal of Clinical Nutrition (2003) 78: 1024-9.
Samuel Martin-Sosa et al., "Distribution of Sialic Acids in the Milk of Spanish Mothers of Full Term Infants During Lactation," Journal of Pediatric Gastroenterology and Nutrition (2004) 39: 499-503.
Susan E. Carlson, "N-Acetylneuraminic acid concentrations in human milk oligosaccharides and glycoproteins during lactation[1-3]," The American Journal of Clinical Nutrition (1985) 41: 720-6.
S. Martin-Sosa et al., "Sialyloligosaccharides in Human and Bovine Milk and in Infant Formulas: Variations with the Progression of Lactation," Journal of Dairy Science (2003) 86: 52-59.
B. Wang et al., "Concentration and distribution of sialic acid in human milk and infant formulas[1-3]," The American Journal of Clinical Nutrition (2001) 74: 510-5.
M. J. Martin et al., "Distribution of Bovine Milk Sialoglycoconjugates During Lactation," Journal of Diary Science (2001) 84: 995-1000.
Benoit Laplaize, Sialyloligosaccharides for Infant Food, 4th International Whey Conference, Chicago, Sep. 11-14, 2005.
A. Scacchi et al., "Detection, Characterization, and Phytotoxic Activity of the Nucleoside Antibiotics, Blasticidin S and 5-Hydroxylmethyl-Blasticidin S,"Journal of Plant Growth Regulation., 1992, vol. 11, No. 1, pp. 39-46.
K. F. Eckner et al., "Partitioning of Skim Milk Components as a Function of pH, Acidulant, and Temperature During Membrane Processing" Journal of Dairy Science, Aug. 1992, vol. 75, No. 8, pp. 2092-2097.

*Primary Examiner* — Leslie Wong
(74) *Attorney, Agent, or Firm* — Finnegan Henderson Farabow Garrett & Dunner L.L.P.

(57) ABSTRACT

A concentrate derived from milk or a milk product comprising sialyllactose in amounts higher than the normal amounts found in the milk or milk product and a process for preparation of such a concentrate by ultrafiltration and diafiltration using a thin film polyamide based membrane. The concentrate is suited for use in nutritional products.

15 Claims, No Drawings

CONCENTRATE DERIVED FROM A MILK PRODUCT ENRICHED IN NATURALLY OCCURING SIALYLLACTOSE AND A PROCESS FOR PREPARATION THEREOF

CROSS REFERENCE TO RELATED APPLICATIONS

This application is a divisional of U.S. application Ser. No. 11/592,219, filed Nov. 3, 2006, now abandoned, and claims the benefit of U.S. Provisional Application No. 60/733,204, filed Nov. 4, 2005, the contents of both of which are incorporated herein by reference.

FIELD OF THE INVENTION

The present invention relates to a milk derived sialyllactose concentrate for the use in foods especially intended for infants, children or elderly persons as well as foods for medical or dietetic purposes and other food applications. The invention also comprises a process for producing the sialyllactose concentrate.

BACKGROUND OF THE INVENTION

Communication between cells is central and ubiquitous in the human body. Key players in these processes are extracellular carbohydrate moieties bound to specific substances, e.g. different membrane molecules, cytokines or pathogens. One important component of these carbohydrate moieties is sialic acid, a nine-carbon monosaccharide present in most human and animal tissues. The concentration of sialic acid is high in tissues with high rates of processing and interaction such as the brain. It is present in all human body fluids, of which its content is especially high in milk. Sialic acid can be synthesised by the body.

Sialic acid has gained much scientific focus the last two decades, see Wang, B. and Brand-Miller J., *The role and potential of sialic acid in human nutrition*, Eur J Clin Nutr 2003; 57:1351-1369, and Schnauer R., *Achievements and challenges of sialic acid research*, Glycoconjugate J 2000; 17:485-499. Its role in cell communication covers regulation of molecular interactions, e.g. in the communication between cells and infectious agents. It is a structural part of cell membrane molecules, such as gangliosides and glycoproteins.

The dietary aspects of the emerging knowledge on sialic acid function in the human body have also been studied. Sialic acid is a major part of human milk oligosaccharides, indicating a nutritional role. Furthermore, brain and saliva of breast fed infants were found to contain significantly more sialic acid than those of infants fed commercial formula containing only minute amounts of sialic acid, suggesting an effective absorption of this carbohydrate moiety (see Tram, T. H., et al., *Sialic acid content of infant saliva: comparison of breast fed with formula fed infants*, Arch Dis Childh 1997: 77:315-8, Wang, B., et al., *A longitudinal study of salivary sialic acid in preterm infants: Comparison of human milk-fed versus formula-fed infants*, J Pediatr 2001; 138:914-6 and Wang B., et al., *Brain ganglioside and glycoprotein sialic acid in breast-fed compared with formula-fed infants*, Am J Clin Nutr 2003; 78:1024-9).

Sialic acid exists in several chemical forms in nature. In body tissues it is found as part of oligosaccharide chains bound to proteins or lipids with only little available as free sialic acid. In milk it is mainly bound to glycoproteins or free oligosaccharides. However, minor quantities are found as free or lipid bound sialic acid.

In human milk, the majority of sialic acid is bound to oligosaccharides. The concentration of oligosaccharides containing sialic acid vary greatly with lactation stage as well as individually. Several authors have measured the content in human full term milk, finding contents ranging from more than 1 g/L in the first week to around 90-450 mg/L in mature milk (see Martin-Sosa, S., et al., *Distribution of Sialic Acids in the Milk of Spanish Mothers of Full Term Infants During Lactation*, J Pediatr Gastroenterol Nutr 2004; 39:499-503, Carlson, S. E., *N-Acetylneuraminic acid concentrations in human milk oligosaccharides and glycoproteins during lactation*, Am J Clin Nutr 1985; 41:720-6, Martin-Sosa, S., et al., *Sialyloligosacchardies in Human and Bovine Milk and in Infant Formulas: Variations with the Progression of Lactation*, J Dairy Sci 2003; 86:52-59, and Wang, B., et al. *Concentration and distribution of sialic acid in human milk and infant formulas*, Am J Clin Nutr 2001; 74:510-5).

In contrast, the majority of sialic acid in bovine milk is bound to proteins. Bovine mature milk contains only little oligosaccharide bound sialic acid. In colostrums the content is around 230 mg/L, whereas it is 25-54 mg/L in mature bovine milk (see Martin, M. J., et al., *Distribution of Bovine Milk Sialoglycoconjugates During Lactation*, J Dairy Sci 2001; 84:995-1000, and Martin-Sosa, S., et al., *Sialyloligosacchardies in Human and Bovine Milk and in infant Formulas: Variations with the Progression of Lactation*, J Dairy Sci 2003; 86:52-59).

Bovine based infant and follow on formulas are produced from mature bovine milk and the content of oligosaccharide bound sialic acid in these products has been found to be 15-35 mg/L, whereas that of preterm formulas was found to be slightly higher with 80 mg/L. Soy formulas contain no oligosaccharide bound sialic acid. See Wang, B., et al. *Concentration and distribution of sialic acid in human milk and infant formulas*, Am J Clin Nutr 2001; 74:510-5 and Martin-Sosa, S., et al., *Sialyloligosacchardies in Human and Bovine Milk and in Infant Formulas: Variations with the Progression of Lactation*, J Dairy Sci 2003; 86:52-59.

With the sialyllactose concentrate of the present invention, infant formulas can be enriched with oligosaccharide bound sialic acid in concentrations matching human milk, i.e. the total concentration of oligosaccharide bound sialic acid can be increased to 100-1500 mg/L matching concentrations of human milk of various lactation stages. However, the scope of the present invention is not limited to this range of enrichment due to the great variations in human milk composition and also due to the fact that other food applications may require other oligosaccharide bound sialic acid concentrations.

Commercially, sialic acid containing ingredients for use in foods are available. One such ingredient is bovine sialic acid bound to the protein κ-casein, commercially available from Aria Foods (Denmark) among others. Synthetically produced sources of sialic acid also exist, e.g. synthetic sialyllactose from MoBiTech, Germany, as well as recombinant human κ-casein containing sialic acid (see U.S. Pat. No. 6,270,827).

Thus, existing commercially available products containing sialic acid are either not obtained from natural sources, i.e. they are produced synthetically or by using recombinant techniques, or they comprise sialic acid bound primarily to proteins and not oligosaccharides as in human milk. The product of the present invention is as far as we know the first product comprising a concentrate of oligosaccharides containing sialic acid which is derived from a natural ruminant milk source in a high concentration.

SUMMARY OF THE INVENTION

The present invention relates to a concentrate derived from a milk product enriched in naturally occurring sialyllactose in a milk product, so that the content of sialyllactose is from 0.32 to 25% by weight, based on dry matter. The concentrate can be dried. Such a sialyllactose concentrate powder obtained from a natural ruminant milk source are intended to be incorporated into various kinds of foods including, but not limited to, infant formulas and other infant nutrition foods, child nutrition, functional foods and foods for medical and dietetic purposes.

Such a concentrate can according to the invention be prepared by ultrafiltration of a milk product containing naturally occurring sialyllactose followed by diafiltration of the ultrafiltration retentate using the same ultrafiltration membrane, optionally followed by reverse osmosis and/or drying, wherein the membrane is a thin film polyamide based membrane.

DETAILED DESCRIPTION OF THE INVENTION

The concentrate of the invention has a content of sialyllactose from 0.32 to 25% by weight, based on dry matter, preferably 0.4 to 25%, 1 to 25%, 5 to 25%, 10 to 15%.

The milk product can be milk or any milk product derived from a ruminant or another milk producing animal. The milk product can for example be a bovine whey product, such as whey retentate or whey permeate. It can also be the mother liquor from preparation of lactose from whey. It is also possible to use, milk permeates, milk retentates, fractionated milk retentate or any other milk products containing sialyllactose.

The concentrate of the invention can be used as such, or it can be further treated by for example reverse osmosis, crystallisation, affinity chromatography or a combination there of to remove water, or it can be dried alone or together with one or more carriers. Any carriers can be used, such as oil, fat, whey, demineralised whey, whey protein concentrate, whey protein isolate, other whey fractions, whey or milk permeate or concentrate, skimmed milk; whole milk, semi-skimmed milk, milk fractions, maltodextrins, sucrose, lactose, native and pregelatinised starches, glucose syrups, casein and casein fractions.

The concentrate of the invention, including a dried concentrate can be used in any nutritional compositions, such as products for infant nutrition, protein bars, sports nutrition, drinks, health supplements, food for medical purposes and clinical nutrition. Infant nutrition can be, but is not restricted to, infant formulas, follow-on formulas, infant cereal products or growing-up milk, i.e. modified milk or milk powder suitable for children of 1-3 years.

The process will of course also work using two different thin film polyamide based membranes, manufactured by the same or different manufacturers, where one membrane is used for UF and the other for DIA filtration. Alternatively combinations of two or more different thin film polyamide based membranes, manufactured by the same or different manufacturers, could be used simultaneously for UF and DIA filtration. It is necessary that the different membranes possess appropriate MWCO cut off values as described within this patent.

One preferred embodiment of the process of the invention uses a membrane with a suitable molecular weight cut off (MWCO) of 0.5-4 k Dalton with 2.5 k Dalton being most preferable. 1, 1.5, 2, 3, 3.5 k Dalton are also useful.

The membrane is a thin film polyamide based membrane such as a GE Osmonics GH series membrane or a corresponding membrane normally used for ultrafiltration. The temperature is not critical, but normally 4-50° C. will be used, for example 5, 6, 7, 8, 9 or 10° C., but also higher temperatures such as 11, 12, 13, 14, 15 or even 20, 25, 30, 35, 40, 45 or 50° C. can be used.

The pressure is not critical, but normally 1-40 bar will be used. The recommendation of the membrane manufacturer can be used. The best results will normally be at 1-10 bar pressure, for example 2, 3, 4, 5, 6, 7, 8, 9, or 10 bar, but also higher pressures such as 11, 12, 13, 14, 15 or even 20, 25, 30, 35, or 40 bar can be used. The feed pressure can be as low as 1 bar and as high as 50 bar. Typically feed pressures are 5-6 bar or 10 bar. The best results are normally obtained using 1-10 bar, but higher feed pressures will normally work, even if they are not as effective.

The present invention used cross-flow spiral wound membranes, however other membranes and configurations may alternatively be used. Alternative membranes and configurations may be, but are not limited to cross-flow filtration, dead-end filtration, plate and frame systems, cartridge systems, oscillating systems, flat sheet membranes, spiral wound membranes, fibre membranes, and tubular membranes. The membrane is housed in a suitable process unit allowing contacting of the feed and membrane with control of process parameters such as, but not limited to: temperature, pressure, flow rate, pH, etc. The membrane will separate the feed into permeate and retentate process streams. Process streams may be completely removed from the process unit, or in some manner completely or partially recycled within the process unit and associated supply system (tanks and process streams). Prior to use, the membranes and process units are cleaned according to the membrane manufacturer's instructions, using manufacturer approved cleaning agents and process parameters.

DEFINITIONS AND SPECIAL EQUIPMENT

In the present invention sialyllactose concentrations have been measured using high performance liquid chromatography (HPLC) equipped with a UV detection system and a Shodex column, however any state of the art technique with acceptable accuracy may be employed.

Typical state of the art techniques include, but are not limited to: spectroscopic techniques, chromatographic techniques, enzyme assays, ELISA, other wet chemical assays, etc.

The present invention measured process stream lactose concentrations with ATAGO® (Tokyo, Japan) model N1-E and N1-α refractometers and an enzymatic lactose assay kit from Roche (Boehringer Mannheim), however any state of the art technique with acceptable accuracy may be employed. There was a linear correlation (calibration curve) between process stream refractive index and the corresponding process stream lactose concentration as measured by the enzymatic lactose assay. The calibration curve allowed refractive index measurements to be used for "real time" estimation of lactose levels in the process streams.

Ultrafiltration (UF) is in the present invention defined as a membrane separation process utilizing 0.5-500 k Dalton MWCO membranes, even if it would be more correct to call a filtration utilizing a 0.5 k Dalton membrane a nanofiltration process.

Diafiltration (DIA) is in the present invention defined as a membrane separation process that adds water to the retentate, batch wise or continuous additions, and continues the removal of membrane permeating species with the water.

Reverse osmosis (RO) is defined as essentially a dewatering technique, removing water and small aqueous solutes through the RO membrane.

An example of suitable ultrafiltration and diafiltration membranes are GE Osmonics (Minnetonka, Minn., USA) GH series membranes.

Typical industrial applications of GH membranes include: textile dye desalting and concentration, colour removal from wastewater streams, and chemical purifications. GH membranes are typically not used in the dairy industry, with this patent describing their first known usage for purification of sialyllactose from a dairy derived feed.

Although the content of sialyllactose in ruminant milk is low relative to the total carbohydrate content, surprisingly, an attempt to concentrate sialyllactose was found to be successful. Through several membrane filtration techniques described below it was possible to produce a nutritional compound with a content of sialyllactose of 1 w/w % to 40 wt/wt %, preferably, 5 wt/wt % to 20 wt/wt %, a lactose content of 1 wt/wt % to 95 wt/wt % and a protein content of 0 wt/wt % to 95 wt/wt %.

The process may be run at any temperature as long as the manufacturer's recommended maximum temperature of 50° C. for GH series membranes is not exceeded.

Feed pH should not exceed the membrane manufacturers recommended maximum limits, typically 1-13. The present invention uses dairy derived materials as feed streams, which are typically, but not limited to, pH 6-7. The dairy derived feed materials are fed directly to the process without the addition of acids, bases, buffers, or other materials commonly used to standardize pH.

Differential membrane pressure should not exceed the membrane manufacturer's recommended maximum limits, typically 0.5-1.5 bar per membrane element. Feed pressure may be adjusted to give optimal membrane permeability, with higher pressures typically compressing the membrane pores and affecting permeability. The present invention uses, but is not limited to feed pressures of 1-40 bar. Feed pressures of 1-20 bar are preferable with feed pressures of 5-10 bar being optimal for the Osmonics GH series membranes. pH is not critical within the recommended range of 2 to 11.

The concentrate of the present invention containing highly elevated levels of sialyllactose can be produced by membrane filtration of a milk derived feed such as whey, milk, buttermilk, or fractions thereof. The milk derived feed is ultrafiltrated to yield a sialyllactose rich retentate with significantly reduced lactose and ash content. This sialyllactose rich retentate is then diafiltered to further reduce lactose and ash contents.

Optionally it is possible to further concentrate the concentrate obtained by ultrafiltration and diafiltration by reverse osmosis or other steps removing liquid without amendment of the content of sialyllactose, based on the weight of dry matter. Thus the ultrafiltration/diafiltration concentrate can be further concentrated via reverse osmosis to a reverse osmosis concentrate with about 1-40% sialyllactose (wt/wt of dry matter). The process feed may be sialyllactose ultrafiltration or diafiltration concentrates, a mixture of sialyllactose ultrafiltration or diafiltration concentrates, a mixture of fresh feed and sialyllactose ultrafiltration or diafiltration concentrates, or a diluted form of any of the aforementioned feeds. The process runs until a desired level of sialyllactose concentration occurs in the concentrate.

Crystallisation or affinity chromatography or both of these methods can also be combined with the mentioned filtration techniques.

In another embodiment of the invention, the concentrate is dried alone or with a suitable carrier material such as whey, demineralised whey, whey/WPI, other whey fractions, whey or milk permeate or concentrate, skimmed milk, whole milk, semi-skimmed milk, maltodextrins, sucrose, lactose, or native or pregelatinised starches, yielding an ingredient suitable for incorporation in materials requiring sialyllactose enrichment. The product can either be spray dried or freeze dried.

The sialyllactose concentrate is suitable for use in foods such as, but not limited to, infant nutrition, protein bars, sports nutrition, drinks, health supplements, food for medical purposes and clinical nutrition, supplying a daily physiologically interesting dose of sialyllactose. However, it would also be technically and nutritionally feasible to incorporate it into other kinds of food applications.

The invention is further illustrated by the following non limiting examples.

EXAMPLE 1

3500 kg fractionated milk retentate was ultrafiltered using 12 GH804OC1566 ultrafiltration membranes (GE Osmonics, material nr. 1207118), a feed temperature of 10° C. and pressure of 5-7 bar.

After reduction of feed volume to 500 kg by ultrafiltration, batch diafiltration (12×GH804OC1566 ultrafiltration membranes, GE Osmonics, material nr. 1207118) was applied at a feed temperature of 10° C. and pressure of 5-7 bar. Diafiltration water (3 additions, 1430 kg total) was added batch-wise to the filtration plant. The diafiltration ran until a diafiltration permeate refractive index≦0.1 brix.

Diafiltration yielded 106 kg diafiltration retentate, which was concentrated by reverse osmosis (1×SF3840 reverse osmosis membrane, GE Osmonics) at feed temperature of 5-10° C. and pressure of 25 bar.

Reverse osmosis filtration reduced the 106 kg diafiltration retentate to 14.5 kg concentrate, which was dried to a final powder containing (wt/wt of dry matter):

| | |
|---|---|
| Sialyllactose | 14% |
| Lactose | 44% |
| Protein | 8% |
| Fat | 0.1% |
| Minerals | 8% |

This product will in the following examples be referred to as the sialyllactose concentrate.

EXAMPLE 2

1600 kg fractionated whey permeate was ultrafiltered using 18 GH3840-30D ultrafiltration membranes (GE Osmonics), a feed temperature of 10° C. and pressure of 5-7 bar.

After reduction of feed volume to 170 kg by ultrafiltration, diafiltration (18×GH3840-30D ultrafiltration membranes, GE Osmonics) was applied at a feed temperature of 10° C. and pressure of 5-7 bar. Diafiltration water (904 kg total) was added continuously to maintain constant retentate volume in the filtration plant. The diafiltration ran until a diafiltration permeate refractive index≦0.2 brix.

Diafiltration yielded 170 kg diafiltration retentate: 0.4% dry weight, 0.030 sialyllactose, and 0.22% lactose. This corresponds to a sialyllactose concentrate containing 7.5% sisllyllactose (wt./wt. of dry matter).

EXAMPLE 3

3000 kg fractionated whey retentate was ultrafiltered using 18 GH3840-30D ultrafiltration membranes (GE Osmonics), a feed temperature of 10° C. and pressure of 5-7 bar.

After reduction of feed volume to 170 kg by ultrafiltration, diafiltration (18×GH3840-30D ultrafiltration membranes, GE Osmonics) was applied at a feed temperature of 10° C. and pressure of 5-7 bar. Diafiltration water (1241 kg total) was added continuously to maintain constant retentate volume in the filtration plant. The diafiltration ran until a diafiltration permeate refractive index≦0.5 brix.

Diafiltration yielded 170 kg diafiltration retentate, which was concentrated to 21.29 kg by reverse osmosis (1×SF3840 reverse osmosis membrane, GE Osmonics) at feed temperature of 5-10° C. and pressure of 25 bar.

8.63 L reverse osmosis concentrate was batch diafiltered (1×GH3840-30D diafiltration membrane, GE Osmonics) at a feed temperature of 10° C. and pressure of 5-7 bar. Diafiltration water (3 additions, 69.5 kg total) was added batch-wise to the filtration plant. The diafiltration retentate was dried to a sialyllactose concentrate containing 7.17% sialyllactose (wt/wt of dry matter).

EXAMPLE 4

The sialyllactose concentrate produced in Example 1 is mixed in a mixing vat with a whey protein concentrate containing 80 wt/wt % protein (Lacprodan 80, Aria Foods, Denmark) until completely dissolved. The whey protein concentrate is added through a powder addition funnel connected to the flow of the recirculation of the sialyllactose concentrate. Sialyllactose concentrate and the whey protein concentrate is mixed in a combination of 33% sialyllactose concentrate and 66% whey protein concentrate.

The mixed concentrate is led through an in-line mixer before returning to the mixing vat, where it is agitated. After mixing, the concentrate is pumped to a new vat, from which it is pumped through a plate preheater (preheating temperature of 75° C.) to the spray tower. By means of a high pressure pump the mix is pumped to a Niro spraytower and sprayed with the following conditions:

| | |
|---|---|
| Spray pressure | 195 bar |
| Nozzles | Delawan 4 × 28/54 |
| Hot air temp | 200° C. |
| Exhaust air temp | 92° C. |

These processes yielded a final sialyllactose concentrate protein powder with the following composition (wt/wt of dry matter):

| | |
|---|---|
| Sialyllactose | 5% |
| Lactose | 21 |
| Protein | 60% |
| Fat | 6% |
| Minerals | 8% |

EXAMPLE 5

In this example of the present invention, a milk based starter infant formula is enriched with the sialyllactose concentrate, but other formulas such as follow on, growing up, preterm or soy based formulas could also be enriched in a similar way and are therefore, considered covered by this example. The examples are prepared to fulfil fullfill the EU legalisation (Commission Directive 91/321/EEC on infant formulae and follow-on formulae) regarding concentrations of fat, protein, carbohydrates and ashes.

In the calculations of this example of the present invention, it is assumed that the natural concentration of oligosaccharide bound sialic acid in bovine milk based infant formula is 30 mg/L. The target concentration after enrichment is 260 mg/L, which is within the range of the content of mature human milk.

In table 1, the nutrient distribution of typical ingredients used for a starter infant formula as well as of the final formula is shown. In the example of table 2, the same infant formula is enriched with 2.369 g sialyllactose concentrate per 100 g powder, which equals 354 mg sialyllactose or 173 mg oligosaccharide bound sialic acid per 100 g powder. With a powder addition of 133 g per L, the formula is enriched with 230 mg oligosaccharide bound sialic acid per L. On top of this, a natural oligosaccharide bound sialic acid content of around 30 mg/L is also present in the formula, making the total oligosaccharide bound sialic acid content about 260 mg/L.

The infant formula of the example presented in table 3 is enriched with 7.080 g sialyllactose concentrate protein powder per 100 g formula, which equals 354 mg sialyllactose or 173 mg oligosaccharide bound sialic acid per 100 g powder. As above, the powder addition was 133 g per L, resulting in an enrichment with 230 mg oligosaccharide bound sialic acid per L on top of the natural oligosaccharide bound sialic acid content of around 30 mg/L, totaling a oligosaccharide bound sialic acid content of about 260 mg/L of the final formula.

TABLE 1

Nutrient distribution of the ingredients of a typical starter infant formula as well as that of the final formula with a casein to whey protein ratio of 40/60

| Ingredient | Addition | Fat | Protein | Carbohydrates | Ash |
|---|---|---|---|---|---|
| | | g/100 g powder | | | |
| Fats and oils solids | 25.255 | 25.255 | 0 | 0 | 0 |
| Skimmed milk solids | 17.271 | 0.177 | 6.601 | 8.978 | 1.402 |
| Whey protein concentrate solids | 8.100 | 0.567 | 6.399 | 0.891 | 0.234 |
| Lactose | 44.514 | 0 | 0 | 44.514 | 0 |
| Minerals | 1.360 | 0 | 0 | 0 | 1.360 |
| Vitamin preblend | 0.500 | 0 | 0 | 0.460 | 0 |
| Moisture | 3.000 | 0 | 0 | 0 | 0 |
| Nutrient distribution in infant formula | | 26.00 | 13.00 | 54.77 | 3.00 |

TABLE 2

Nutrient distribution of the ingredients of a starter infant formula as well as that of the final formula with a casein to whey protein ratio of 40/60 and enriched with the sialyllactose concentrate of Example 1 of the present invention

| Ingredient | Addition | Fat | Protein | Carbohydrates | Ash |
|---|---|---|---|---|---|
| | | g/100 g powder | | | |
| Fats and oils solids | 25.227 | 25.227 | 0 | 0 | 0 |
| Skimmed milk solids | 17.271 | 0.177 | 6.601 | 8.978 | 1.402 |
| Whey protein concentrate solids | 7.500 | 0.525 | 5.925 | 0.825 | 0.225 |
| Lactose | 43.133 | 0 | 0 | 43.106 | 0 |

TABLE 2-continued

Nutrient distribution of the ingredients of a starter infant formula as well as that of the final formula with a casein to whey protein ratio of 40/60 and enriched with the sialyllactose concentrate of Example 1 of the present invention

| Ingredient | Addition | Fat | Protein | Carbohydrates | Ash |
|---|---|---|---|---|---|
| | | | g/100 g powder | | |
| Sialyllactose concentrate | 2.369 | 0.071 | 0.472 | 1.44 | 0.377 |
| Minerals | 1.000 | 0 | 0 | 0 | 1.000 |
| Vitamin preblend | 0.500 | 0 | 0 | 0.460 | 0 |
| Moisture | 3.000 | 0 | 0 | 0 | 0 |
| Nutrient distribution in infant formula | | 26.00 | 13.00 | 54.81 | 3.00 |

TABLE 3

Nutrient distribution of the ingredients of a starter infant formula as well as that of the final formula with a casein to whey protein ratio of 40/60 and enriched with the sialyllactose concentrate protein powder of Example 2 of the present invention

| Ingredient | Addition | Fat | Protein | Carbohydrates | Ash |
|---|---|---|---|---|---|
| | | | g/100 g powder | | |
| Fats and oils solids | 25.208 | 25.208 | 0 | 0 | 0 |
| Skimmed milk solids | 17.271 | 0.177 | 6.601 | 8.978 | 1.402 |
| Whey protein concentrate solids | 2.717 | 0.190 | 2.146 | 0.299 | 0.082 |
| Lactose | 43.274 | 0 | 0 | 43.231 | 0 |
| Sialyllactose concentrate protein powder | 7.080 | 0.425 | 4.248 | 1.841 | 0.566 |
| Minerals | 0.950 | 0 | 0 | 0 | 0.950 |
| Vitamin preblend | 0.500 | 0 | 0 | 0.460 | 0 |
| Moisture | 3.000 | 0 | 0 | 0 | 0 |
| Nutrient distribution in infant formula | | 26.00 | 13.00 | 54.81 | 3.00 |

For simplicity the different minerals and vitamins are not specified, but it is clear that the mineral and vitamin additions should be adjusted according to the contribution from the sialyllactose concentrate and the sialyllactose concentrate protein powder. Also, for calculation of the 40/60 casein/whey protein ratio, the protein of the sialyllactose concentrate and the sialyllactose concentrate protein powder are considered as whey protein, and furthermore, the sialyllactose of these two ingredients are considered as carbohydrate. Part of the nitrogen of the sialyllactose concentrate and the sialyllactose concentrate protein powder is not true protein meaning that the protein level should be adjusted accordingly, but for simplicity reasons this is not included in the example.

The invention claimed is:

1. A process for the preparation of a sialyllactose concentrate from a milk product containing naturally occurring sialyllactose comprising the steps of:
  (i) ultrafiltration of a milk product containing naturally occurring sialyllactose with a membrane to obtain an ultrafiltration retentate; and
  (ii) diafiltration of the ultrafiltration retentate with a membrane to obtain a sialyllactose concentrate,
  wherein the membranes are a thin film polyamide based membrane.

2. The process according to claim 1, wherein the membrane for ultrafiltration in step (i) and the membrane for diafiltration in step (ii) is the same membrane.

3. The process according to claim 1, wherein the milk product is from a natural ruminant milk source.

4. The process according to claim 1, wherein the membranes have a molecular weight cut off (MWCO) value of 0.5-4 k Dalton.

5. The process of claim 1, wherein the membranes have a molecular weight cut off (MWCO) value of 2.5 kD.

6. The process according to claim 1, wherein the ultrafiltration in step (i) and diafiltration in step (ii) are run at a temperature between 2° C. and 50° C. and a feed pressure between 1 and 50 bar.

7. The process according to claim 1, wherein the ultrafiltration in step (i) and diafiltration in step (ii) are run at a temperature between 4° C. and 15° C. and a feed pressure between 5 and 20 bar.

8. The process according to claim 1, wherein the ultrafiltration in step (i) and diafiltration in step (ii) are run at a temperature of about 10° C. and a feed pressure of about 5-7 bar.

9. The process according to claim 1, wherein the concentrate is further treated by reverse osmosis, crystallization, chromatography, drying or a combination thereof or drying together with one or more carriers.

10. The process according to claim 1, wherein the membranes are cross-flow spiral wound membranes.

11. The process according to claim 1, wherein the milk product is selected from the group consisting of a whey product, whey permeate, whey retentate, fractionated milk retentate or milk permeate and mother liquid from lactose production.

12. The process of claim 1, wherein the milk product is mother liquid from lactose production.

13. The process according to claim 1, wherein the concentrate is dried alone or together with one or more carriers chosen from the group consisting of oils and fats, whey, demineralized whey, whey protein concentrate, whey protein isolate, other whey fractions, whey or milk permeate or concentrate, skimmed milk, whole milk, semi-skimmed milk, milk fractions, maltodextrins, sucrose lactose, native and pregelatinized starches, glucose syrups, casein and casein fractions.

14. The process according to claim 1, wherein the process further comprises subjecting the concentrate obtained after the diafiltration step to a step of at least one of reverse osmosis or drying.

15. The process according to claim 1, wherein the milk product does not contain added acids, bases, buffers, or materials used to standardize pH.

* * * * *